UNITED STATES PATENT OFFICE

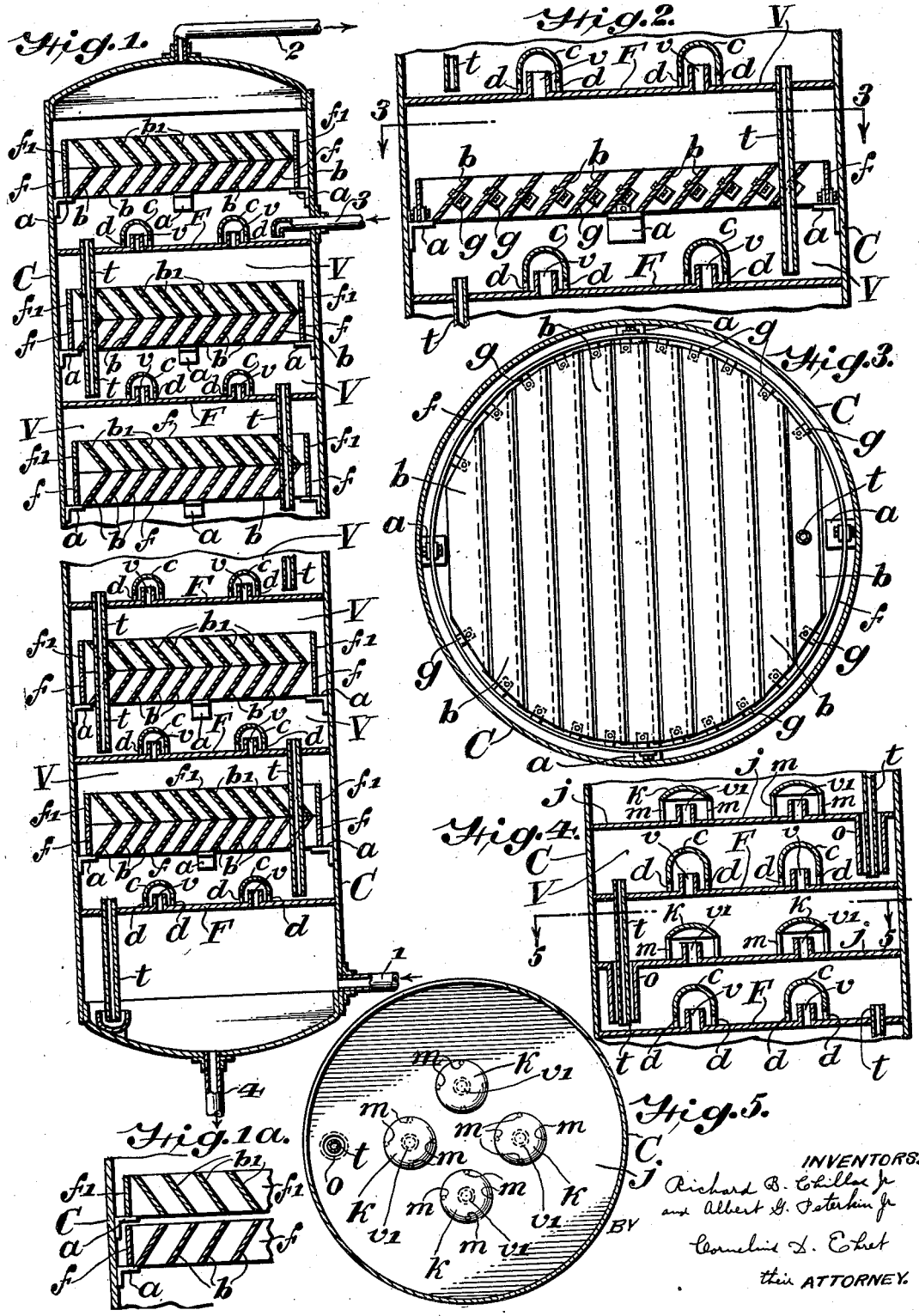

RICHARD B. CHILLAS, JR., OF PHILADELPHIA, AND ALBERT G. PETERKIN, JR., OF BRYN MAWR, PENNSYLVANIA, ASSIGNORS TO THE ATLANTIC REFINING COMPANY, OF PHILADELPHIA, PENNSYLVANIA, A CORPORATION OF PENNSYLVANIA

FRACTIONATING COLUMN

Application filed November 24, 1925. Serial No. 71,165.

Our invention relates to fractional distillation of liquids, especially crude petroleum, petroleum distillate or residuum, and relates more particularly to improvements in fractionating columns of the bubbler plate, sieve plate or equivalent plate type.

In accordance with our invention, spray, liquid particles or mist entrained in and transported by the vapor ascending in the column is prevented from reaching and contaminating liquid of lower boiling point by separating the spray, particles or mist from the vapor in each of the several successive inter-plate chambers or zones, and returning the separated liquid to that through which the vapor has passed.

In accordance with our invention, the separation of entrained liquid from the vapor is effected, without recourse to checker work or column packing, by disposing in the vapor path between successive bubbler, sieve or equivalent plates liquid-separating structure, such as baffle plates, against which the vapor with its entrained liquid impinges and of a form or disposition to cause separation of the liquid and its return to liquid through which the vapor has previously passed.

In accordance with our invention, because of separation of entrained liquid from the vapor, the velocity of the vapor through the fractionating column may be materially higher than in prior practice, with resultant increase in the rate of flow of vapor through the column and consequent increase of capacity of the column, i. e., increase in the vapor throughout per unit of time.

Our invention resides in apparatus of the character hereinafter described and claimed.

In fractional distillation, as heretofore commonly practiced with columns of the bubbler plate, sieve plate or equivalent plate type, the vapor of the liquid to be fractionated is introduced adjacent the bottom of the column, passes upwardly through successive vertically spaced plates, bubbling through pools of reflux liquid on each plate, to cause interchange of constituents, some of the higher boiling components in the vapor phase being condensed and thereby liberating their latent heat of vaporization which vaporizes lower boiling components of the liquid. In consequence, in progressing upwardly through the column the vapor becomes richer in low boiling constituents at the expense of the higher boiling components. The vapor leaving the column adjacent its top is condensed, and a portion of the condensate is returned to the column adjacent its upper end and passes downwardly through the column as reflux liquid which becomes progressively richer in high boiling constituents, and is finally withdrawn from the column adjacent its bottom. In operation of the column, the liquid on each plate is in a state of agitation, more or less violent, and a portion of the liquid becomes entrained by the vapor and is transported upward therewith as liquid spray, drops or mist. Some of the liquid particles fall back on to the plate, while others are transported by the vapor through the plate above into contact with the liquid thereon, thereby contaminating the liquid on the upper plate with the higher boiling liquid from the lower plate. The amount of liquid so entrained by the ascending vapor is dependent upon the magnitude of the vapor velocity through the column, and particularly through the liquid pools overlying the plates therein, and in consequence the vapor velocity practicable or allowable with a given column limits its capacity, the rate of flow of vapor therethrough and the rate of fractionation effected thereby. Therefore, for any column, the maximum quantity of vapor which may be operated upon therein is such that the vapor velocity does not attain that magnitude at which the entrainment of liquid begins to become significant.

It is the object of our invention to improve upon such prior practice by separating the entrained liquid from the vapor, and more particularly, by increasing the vapor velocity and separating from the vapor the liquid particles incident to the increased velocity.

For an understanding of our method, and for an illustration of some of the various forms our structure may take, reference is to be had to the accompanying drawings, in which:

Fig. 1 is a vertical sectional view, partly in elevation, of a fractionating column in accordance with our invention.

Fig. 1ᵃ is a fragmentary vertical sectional view of a modification.

Fig. 2 is a vertical sectional view, partly in elevation, on enlarged scale, of structure of the character shown in Fig. 1.

Fig. 3 is a horizontal sectional view, partly in plan, taken on the line 3—3 of Fig. 2.

Fig. 4 is a fragmentary vertical sectional view, partly in elevation, of a column in which the baffle structure comprises a continuous plate provided with vapor-passing structure.

Fig. 5 is a horizontal sectional view, partly in plan, taken on the line 5—5 of Fig. 4.

Referring to Fig. 1 C represents fractionating column or tower, as of sheet metal, into which there is delivered through the pipe 1 adjacent its lower end the vapors of the liquid to be fractionated. The pipe 1 may be the vapor line from a pipe still or other form of still in which there is vaporized crude petroleum, petroleum distillate, or petroleum residuum. Communicating with the column adjacent its upper end is the pipe 2, through which is drawn off to a condenser the fractionated vapor, a part of whose condensate is returned through the pipe 3 into the column, adjacent its upper end, as reflux liquid which descends through the column and which, finally enriched by higher boiling point constituents, is drawn off adjacent the bottom of the column through the pipe 4.

Suitably spaced from each other vertically in the column C are the fractionating plates F, of any suitable character, such as the sieve, bubbler or equivalent type. In the example illustrated, the plates are of the bubbler cap type having the upwardly extending vapor uptakes or ports $v$ extending slightly above the plates F and discharging under the caps $c$ discharging at $d$ through the reflux liquid on the upper sides of the plates F, the liquid depth being determined by the height above the plates of the upper ends of the reflux conducting tubes $t$, whose lower ends discharge the reflux liquid on to and adjacent the fractionating plate F below.

Between neighboring plates F there is formed an interplate chamber or zone V, through which the vapor, after passing through or contacting with the reflux liquid upon a lower plate, ascends, passing up through the vapor uptakes or ports $v$ of the plate above.

Because of its contact with the reflux liquid upon the plates F, the vapor current entrains particles of the reflux liquid in the form of spray, drops, particles or mist, and transports them to the reflux liquid on the plate above, causing contamination of the upper pool of liquid with higher boiling point constituents from the pool below. The quantity of liquid so entrained increases with increase in velocity of the vapor, and therefore, with the quantity of vapor flowing through the column per unit of time, that is, upon the rate of vapor flow through the column. In consequence, the capacity of the column is affected and limited by the amount of liquid entrained, or by the vapor velocity. Accepted practice limits this velocity to about 1.3 to about 2 feet per second, depending in part upon the distance between the fractionating plates and based upon the total cross section of the column.

To utilize a vapor velocity which is materially higher than commonly heretofore utilized, thus increasing the capacity of the column, is an object of our invention, and to this end we dispose between neighboring fractionating plates or in the inter-plate chamber or zone, structure, generally comprising a plurality of baffle plates or baffles, upon which the ascending vapor stream impinges, causing the entrained liquid particles to impinge upon the structure and separate from the vapor and to return to a lower reflux liquid pool.

This liquid-separating structure, in accordance with our invention, is to be distinguished from packing or checker work which frequently has been used in fractionating columns to increase the area of contact between reflux liquid and vapor. In our system we employ for the vapor liquid contact, and therefore for the fractionation, plates of any of the well known forms, but interpose between these plates baffle members which serve only for the collection of entrained liquid and which do not materially diminish the vapor space of the column, avoiding therefore any considerable increase in vapor velocity per se. The members are so placed that the main streams of liquid descending through the column, as through the tubes $t$, do not flow over the baffle members and no limitation is therefore imposed on the capacity of the column by their liquid handling capacity.

In the example illustrated in Fig. 1, the liquid-separating or baffle structure comprises a plurality of substantially parallel inclined baffle plates $b$ carried by a ring or frame $f$ resting upon abutments $a$ carried by the column C. Between the plates $b$ are formed upwardly inclined passages through which the vapor ascends, and in passing impinges upon the plates $b$, causing separating of liquid which collects upon the plates and flows downwardly along them back into the reflux pool upon the plate F below. Neighboring plates $b$ are so spaced from each other and so inclined that the upper edge of each laterally overlaps the lower edge of the adjacent plate $b$, whereby the major portion of the entrained liquid is brought into contact with the baffle plates $b$, since there is no passage through which the vapor and entrained liquid may rise vertically unhindered or without coming into contact with baffle plate structure.

With a construction of the character described, vapor entering the column C through the pipe 1 passes upwardly in succession through the fractionating plates F and the reflux liquid pools thereon. The vapor passing rapidly through the reflux liquid entrains particles thereof which are subsequently projected against the inclined baffle surfaces and drop back to the reflux liquid on the plate below, with the result that the vapor reaching the fractionating plate above is relatively dry, in the sense that it is substantially free of liquid particles.

In the example illustrated in Fig. 1, there is provided in each inter-plate space a second baffle structure similar to that described and superposed thereon. This second baffle structure comprises a ring or frame $f^1$ carrying the baffle plates $b^1$, inclined reversely with respect to the lower baffle plates $b$ with the passages between them forming continuations of the passages between the lower plates $b$ and inclined upwardly in opposite sense.

The principle remains the same, however, but there is afforded by this additional structure additional liquid-separating capacity, the reverse inclination of the upper baffle plates $b^1$ having some advantage over the case where the lower baffles $b$ are simply of increased extent.

In Fig. 1ª a generally similar arrangement is shown, except that the frames or rings $f$ and $f^1$ and the baffle plates $b$ and $b^1$ carried by them are spaced vertically from each other.

In Figs. 2 and 3 the arrangement is in general that described in connection with Fig. 1, there being illustrated in this instance the brackets $g$ secured to the ring $f$ and to the individual baffle plates or slats $b$ at their opposite ends. In Fig. 3 there is well illustrated the overlap of the upper edges of the plates $b$ laterally of the lower edges of the next adjacent plates.

In the modification illustrated in Figs. 4 and 5, the baffle structure comprises a continuous or solid plate $j$ disposed between neighboring fractionating plates F and provided with any suitable number of vapor uptakes or ports $v^1$, above which are disposed the caps or covers $k$ supported by legs or columns $m$ upon the plates $j$.

Here again the ascending vapor impinges upon the under sides of the covers $k$, causing separation of the entrained liquid which falls upon the plates $j$, while the vapors continue upwardly through the inter-plate zone or chamber V through the passages $v$ in the plate above. The separated liquid collects upon the plate $j$ and flows downwardly through a tube $o$ to re-join the reflux liquid on the plate F below. As indicated, the reflux conducting tubes $t$ extend through and are spaced from the tubes $o$.

It is characteristic of all the arrangements shown, and of our invention, that the liquid entrained in the vapor strikes the separator structure or baffles, is deflected from its course and is returned to the reflux liquid on a lower fractionating plate, while the relatively dry vapor passes on upwardly through the column. Substantially no liquid is carried from any fractionating plate to the reflux liquid upon a fractionating plate above, even though the velocity of the vapor may be materially in excess of that utilized in ordinary practice. We are able, by means of our invention, to maintain vapor velocities considerably in excess of 3 feet per second and of the order of at least three times the accepted standards. For example, our invention readily permits a vapor velocity of 4 feet per second and we have been able to reach velocities of 6 feet per second and higher without impairing the fractionation through the carrying of entrained liquid from one plate to the plate above. Our preferred rate is about 5 feet per second. These velocity figures are based on the total cross sectional area of the column and represent the vertical velocity through a completely free zone of the column. This increase in vapor velocity correspondingly increases the capacity of the column, and makes possible the fractionation of a larger quantity of liquid per unit of time with a column of a given size.

It will be understood that our invention is not limited as to the type or character of the liquid separating structures employed, that the baffle structures shown in the drawings are exemplary, and that there may be employed any equivalent type of device suitable in association or combination with fractionating plates to separate entrained liquid from the vapor.

In our co-pending application Serial No. 71,093, filed November 24, 1925, is claimed the method of fractionation herein disclosed.

It will further be understood that in the appended claims the term "fractionating plate" is used generically to include plates of the bubbler cap, sieve and equivalent types, of a structure causing the vapor to pass or bubble through the refluxing liquid.

What we claim is:

1. Fractionating apparatus comprising a column, fractionating plates spaced from each other therein, and between fractionating plates baffle members whose total cross sectional area is a relatively small percentage of the total cross sectional area of said column, said baffle members spaced from each other and inclined with respect to the normal course of the vapor between fractionating plates for separating from the vapor and returning to a fractionating plate reflux liquid entrained in the vapor.

2. Fractionating apparatus comprising a column, fractionating plates spaced from each other therein, and means for separating from the vapor reflux liquid entrained therein and for returning the separated liquid to a fractionating plate comprising a plurality of sets of baffle plates forming passages traversed in succession by the vapor, the baffle plates of the different sets being reversely inclined with respect to the course of the vapor.

3. Fractionating apparatus comprising a column, fractionating plates spaced from each other therein, and means for separating from the vapor and returning to a fractionating plate reflux liquid entrained in the vapor comprising a plurality of baffle plates spaced from each other and inclined with respect to the course of the vapor, the upper end of a baffle plate laterally overlapping the lower end of the adjacent baffle plate.

4. Fractionating apparatus comprising a column, fractionating plates spaced from each other therein, a frame disposed between fractionating plates, and a plurality of baffle members carried by said frame and inclined with respect to the course of the vapor for separating therefrom and returning to a fractionating plate reflux liquid entrained in the vapor.

5. Fractionating apparatus comprising a column, spaced plates therein upon which downwardly dropping liquid may collect, means for conducting liquid from one of said plates to another, and baffle structure presenting to vapor passing through said column a relatively large angularly disposed area extending longitudinally of the column and interposed between at least two of said spaced plates, said conducting means preventing the collected liquid from coming into contact with said structure, whereby the velocity of said vapor in passing through said structure is not materially increased and substantially all liquid entrained in the vapor is removed therefrom.

6. Fractionating apparatus comprising a column, means therein defining a plurality of fractionating zones, and means in at least one of said zones for separating from vapor reflux liquid entrained in the vapor comprising a plurality of baffle plate spaced from each other to define passages for the rising vapor, said plates having such thickness and so disposed that the velocity of the vapors upon traversing said passages is not greatly increased.

7. Fractionating apparatus comprising a column, means therein defining a plurality of fractionating zones, and means in at least one of said zones for separating from upwardly passing fluid liquid entrained therein, said last mentioned means comprising baffle plates whose total cross sectional area is a relatively small percentage of the total cross sectional area of said column, said baffle plates forming passages to be traversed in succession by the upwardly passing fluid.

RICHARD B. CHILLAS, Jr.
ALBERT G. PETERKIN, Jr.